(12) United States Patent
Zubenko et al.

(10) Patent No.: US 7,707,223 B2
(45) Date of Patent: Apr. 27, 2010

(54) CLIENT-SIDE JAVA CONTENT TRANSFORMATION

(75) Inventors: Igor V. Zubenko, Palmer, MA (US); Todd Short, Sudbury, MA (US)

(73) Assignee: Cisco Technology, Inc., San Jose, CA (US)

( * ) Notice: Subject to any disclaimer, the term of this patent is extended or adjusted under 35 U.S.C. 154(b) by 712 days.

(21) Appl. No.: 11/117,222

(22) Filed: Apr. 28, 2005

(65) Prior Publication Data

US 2006/0259544 A1    Nov. 16, 2006

(51) Int. Cl.
*G06F 17/30* (2006.01)
(52) U.S. Cl. .................. 707/782; 709/232; 709/237; 709/239
(58) Field of Classification Search .............. 707/10, 707/9; 709/232, 237, 239
See application file for complete search history.

(56) References Cited

U.S. PATENT DOCUMENTS

| 6,067,558 | A | * | 5/2000 | Wendt et al. | 709/202 |
| 6,112,228 | A | * | 8/2000 | Earl et al. | 709/205 |
| 6,282,698 | B1 | * | 8/2001 | Baker et al. | 717/118 |
| 2002/0073155 | A1 | * | 6/2002 | Anupam et al. | 709/205 |
| 2002/0073206 | A1 | * | 6/2002 | Jawahar et al. | 709/227 |
| 2003/0028565 | A1 | * | 2/2003 | Landsman et al. | 707/513 |
| 2003/0229718 | A1 | * | 12/2003 | Tock et al. | 709/246 |
| 2004/0039827 | A1 | | 2/2004 | Thomas et al. | 709/228 |
| 2006/0200773 | A1 | * | 9/2006 | Nocera et al. | 715/764 |

* cited by examiner

*Primary Examiner*—Isaac M Woo
*Assistant Examiner*—Amy Ng
(74) *Attorney, Agent, or Firm*—BainwoodHuang

(57) ABSTRACT

A method, apparatus and computer program product for performing client-side Java content transformation is presented. A first client request is received at a gateway from a web client, and is transmitted from the gateway to a web server, and then the web page is received at the gateway from the web server. At the gateway, the web page is modified to request a content transformation application and is transmitted from the gateway to the web client. A request is received at the gateway for the content transformation application, and the gateway transmits the content transformation application to the client. The content transformation application is run on the client, wherein the content transformation application acquires the applet requested by the client and performs content translation on the applet, resulting in a content transformed applet, which is then run by the client.

27 Claims, 7 Drawing Sheets

CLIENT-SIDE JAVA CONTENT TRANSFORMATION

BACKGROUND

WebVPN (web-based Virtual Private Network) is a remote-access solution that uses the SSL (Secure Sockets Layer) layer of the browser to secure communications between a client PC and a head-end gateway. WebVPN enables users to gain a highly secure connection from any browser-based device, such as a PC located at a client's premises. In this approach, the gateway acts as a proxy for the internal web pages that the client wishes to view. The gateway modifies the HTML (Hyper-Text Markup Language) pages so that all sub-sequent URLs (Universal Resource Locators) embedded in the page are directed to pass through the gateway. This process of page modification is known as content transformation and also as HTML mangling. The problem becomes more difficult when a page contains embedded Java applets. This is because the applet could have been hard-coded to access an internal URL directly. In order for the applet to work effectively in the WebVPN scenario, its hard-coded internal URL's need to be transformed (mangled) to pass though the gateway.

SUMMARY

Conventional systems that perform Java content transformation do so on the head-end gateway. When a client requests the applet's URL, the gateway identifies it as a Java applet and disassembles the Java byte-codes (pseudo java assembly) looking for hard-coded internal URL's. When a hard-coded URL is found, the head-end transforms the URL. This content transformation is also referred to as mangling. In effect the head-end modifies the original program/applet (and possibly re-signed via a digital certificate) before sending the program/applet back to the client. Meanwhile, all the client sees is a gray rectangle (in place where the applet will appear) and a busy browser icon.

Conventional systems implement the content transformation code using Java (rather than direct C). Java content transformation is an important part of a WebVPN solution. There are many benefits to using Java including the fact that there are free third-party Java packages that facilitate the process of disassembling compiled Java byte-codes. However, it is not possible to run the Java code that does the content transformation without a Java Virtual Machine (JVM) installed on the Gateway.

Embodiments of the invention significantly overcome such deficiencies and provide mechanisms and techniques that provide a method of performing client-side Java content transformation. A content transformation application resides on the gateway and is signed with a certificate already trusted by the client. The trust model is based on the fact that the VPN gateway is the VPN termination point and the sole provider of the applet. Prior to downloading the content transformation application, the gateway is authenticated and the communication channel is secured. The content transformation application then downloads the applet-to-be-transformed over the secure channel.

In a particular embodiment of a method for performing client-side Java content transformation, a first client request is received at a gateway from a web client, the first client request including a request for a web page. The first client request is transmitted from the gateway to a web server, and then the web page is received at the gateway from the web server. At the gateway, the web page is modified to request a content transformation application, and the modified web page is transmitted from the gateway to the web client. The web client then requests the content transformation application. A request is received at the gateway from the web client for the content transformation application, and the gateway transmits the content transformation application to the client in response to receiving the request for the content transformation application. The content transformation application is run by the client, wherein the content transformation application acquires an applet requested by the client and wherein the content transformation application performs content translation on the applet requested by the client, resulting in a content transformed applet. The content transformed applet is then run by the client.

Another embodiment of a method of performing client-side Java content transformation includes transmitting a first client request from a web client to a gateway, the first client request including a request for a web page. A web page, which has been modified to request a content transformation application from the secure gateway, is received in response to the transmitting the first client request. A request is transmitted to the gateway from the web client for the content transformation application. The content transformation application is received from the gateway and is run on the client. The content transformation application acquires an applet requested by the client. The content transformation application performs content translation on the applet requested by the client, resulting in a content transformed applet that is then run by the client.

Other embodiments include a computer readable medium having computer readable code thereon for performing client-side Java content transformation. The medium includes instructions for receiving, at a gateway, a first client request from a web client, the first client request including a request for a web page. The medium also includes instructions for transmitting the first client request from the gateway to a web server as well as instructions for receiving, at the gateway, the web page from the web server. Additionally the medium includes instructions for modifying, at the gateway, the web page to request a content transformation application and instructions for transmitting the web page modified to request a content transformation application from the gateway to the web client. Further still, the medium includes instructions for receiving, at the gateway, a request from the web client for the content transformation application, and instructions for transmitting, from the gateway, the content transformation application to the client in response to the receiving a request for the content transformation application. Yet further still, the medium contains instructions for running, on the client, the content transformation application wherein the content transformation application acquires an applet requested by the client and wherein the content transformation application performs content translation on the applet requested by the client, resulting in a content transformed applet.

Another embodiment includes a computer readable medium having computer readable code thereon for performing client-side Java content transformation. The medium includes instructions for transmitting a first client request from a web client to a gateway, the first client request including a request for a web page. The medium also includes instructions for receiving a web page modified to request a content application applet from the secure gateway in response to the transmitting a first client request. The medium further includes instructions for transmitting to the gateway a request from the web client for the content transformation application and instructions for receiving, from the gateway, the content transformation application. The medium additionally includes instructions for running, on the client, the content transformation application wherein the content transformation application acquires an applet requested by the client and wherein the content transformation application performs content translation on the applet requested by the client, resulting in a content transformed applet.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides client-side Java content transformation as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing client-side Java content transformation as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
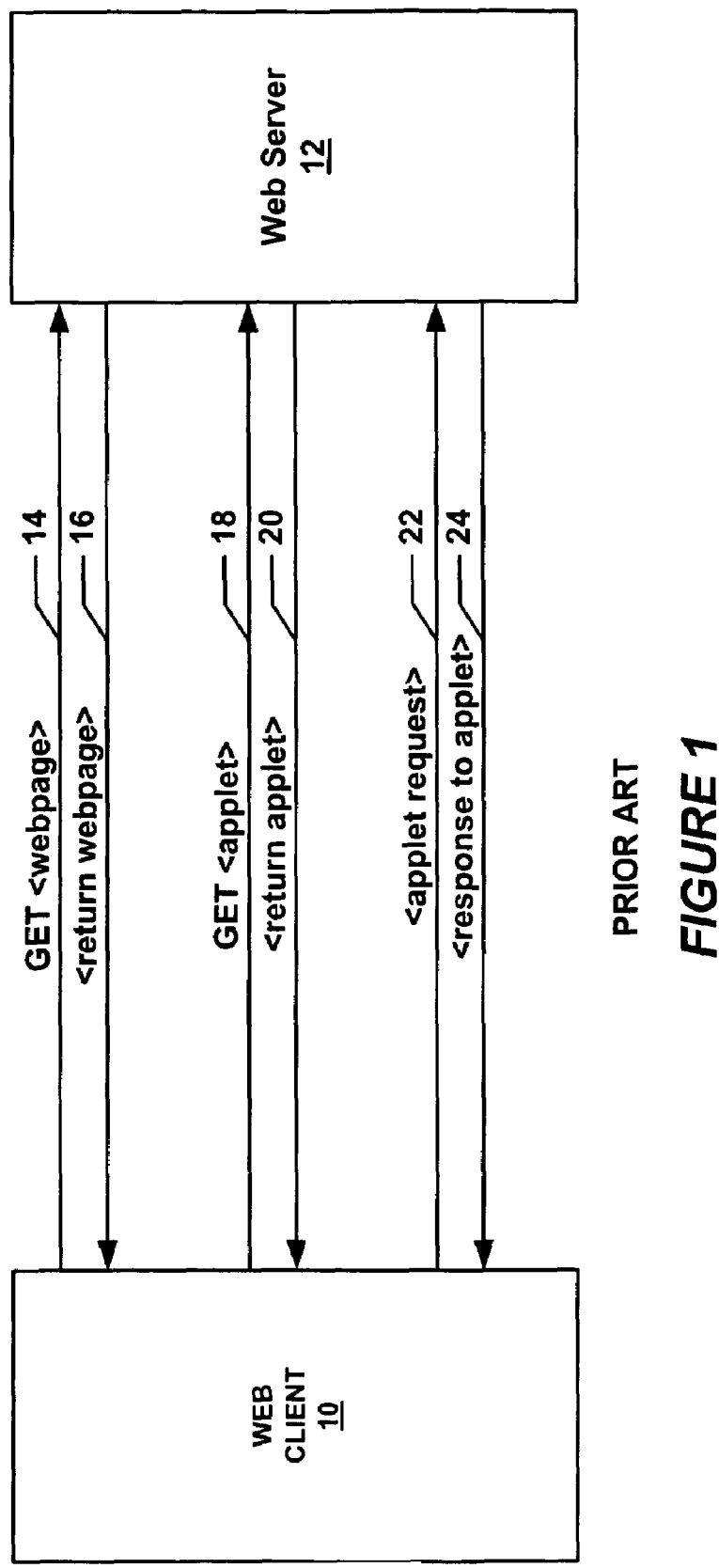
FIG. 1 illustrates an example system that performs conventional applet operations.

Referring to FIG. 1, a conventional Web client/Web Server system is shown. In such a system, a conventional Web client 10 requests a web page from a conventional Web Server 12. This request is shown by the GET <web page> command 14 sent from the Web client 10 to the Web Server 12. The Web Server 12, in response to receiving the GET <web page> command 14 returns the requested web page to the Web client 10 as shown by the <return web page> response 16. For certain web pages, the web page may contain a reference to an applet. In such a case the Web client 10 requests the applet from the Web Server 12 as shown by the GET <applet> command 18. The Web Server 12 responds by returning the applet to the Web client 10, as shown by the <return applet> response 20. The applet may in turn include a hard coded URL (Universal Resource Locator). In such a case the Web client 10 requests the URL via the <applet request> 22 from the Web Server 12. The Web Server responds with the URL contents as shown by the <response to applet> 24. In such a manner web pages, applets and URLs are used to provide various functions on the web client 12.

Figure 2:
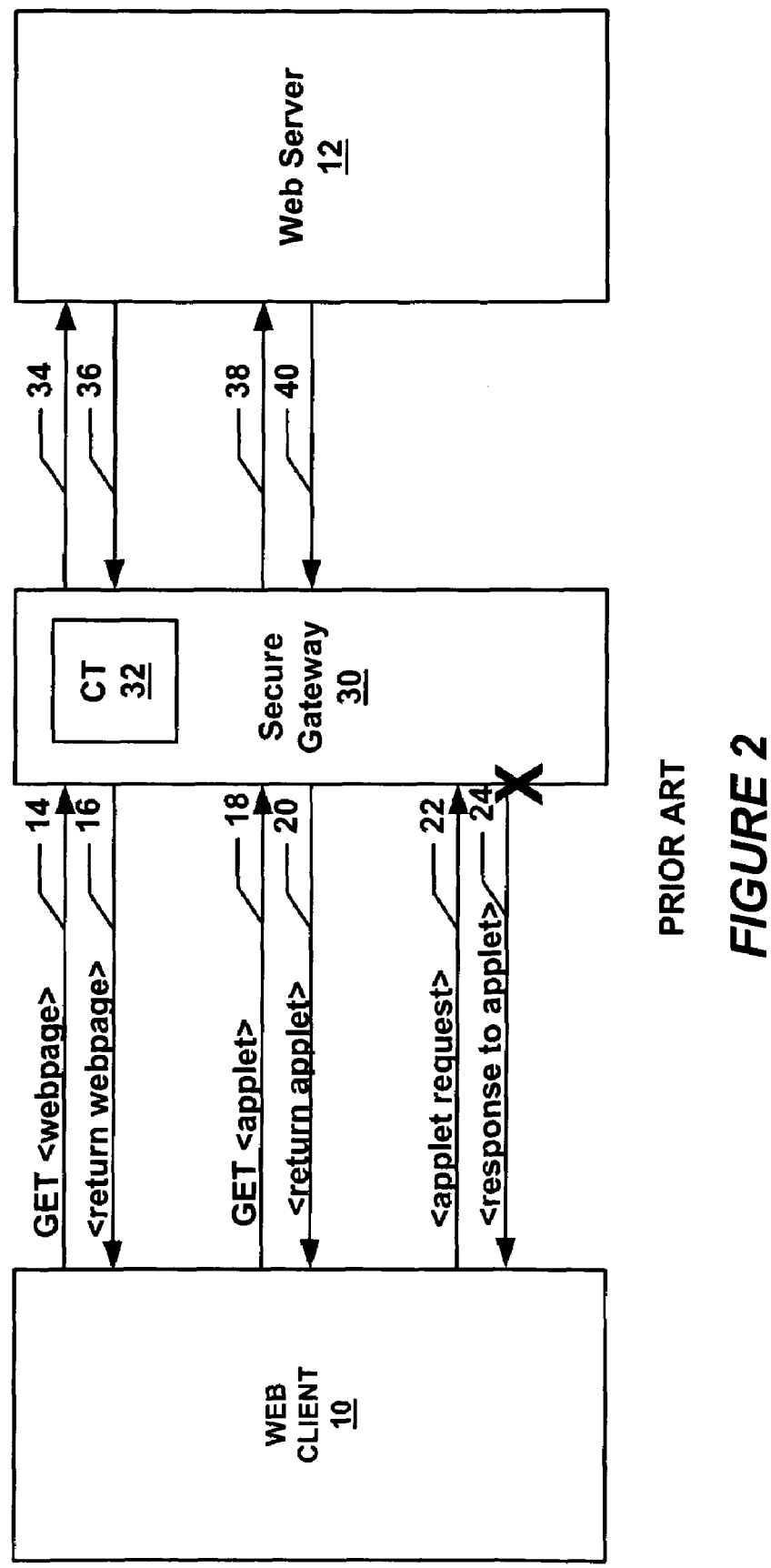
FIG. 2 illustrates an example system that performs conventional applet operations using a secure gateway operation.

In the system of FIG. 2, a Web client 10 requests a web page from a Web Server 12. This request is shown by the GET <web page> command 14 sent from the Web client 10 to the Secure Gateway 30. The Secure Gateway 30 allows the command to be directed to the Web server 12 as shown by command 34. The Web Server 12, in response to receiving the GET <web page> command 34 returns the requested web page 36 to the Secure Gateway 30. The Secure Gateway 30 passes on the web page to the Web Client 10 as shown by the <return web page> response 16. For certain web pages, the web page may contain a reference to an applet. In such a case the Web client 10 requests the applet from the Web Server 12 as shown by the GET <applet> command 18 sent to the Secure Gateway 30. The Secure Gateway 30 forwards the command 38 to the Web Server 12. The Web Server 12 responds by returning the applet 40 to the Secure Gateway 30. The Secure Gateway 30 in turn forwards the applet to the Web client 10, as shown by the <return applet> response 20. The applet may in turn include a hard-coded URL. In such a case, the Web client 10 requests the URL via the <applet request> 22 from the Web Server 12. The Secure Gateway 30 blocks the request for the URL. The request is blocked because the request is hard-coded to go to the Web server 12, and the Secure Gateway 30 does not permit direct access.

Figure 3:
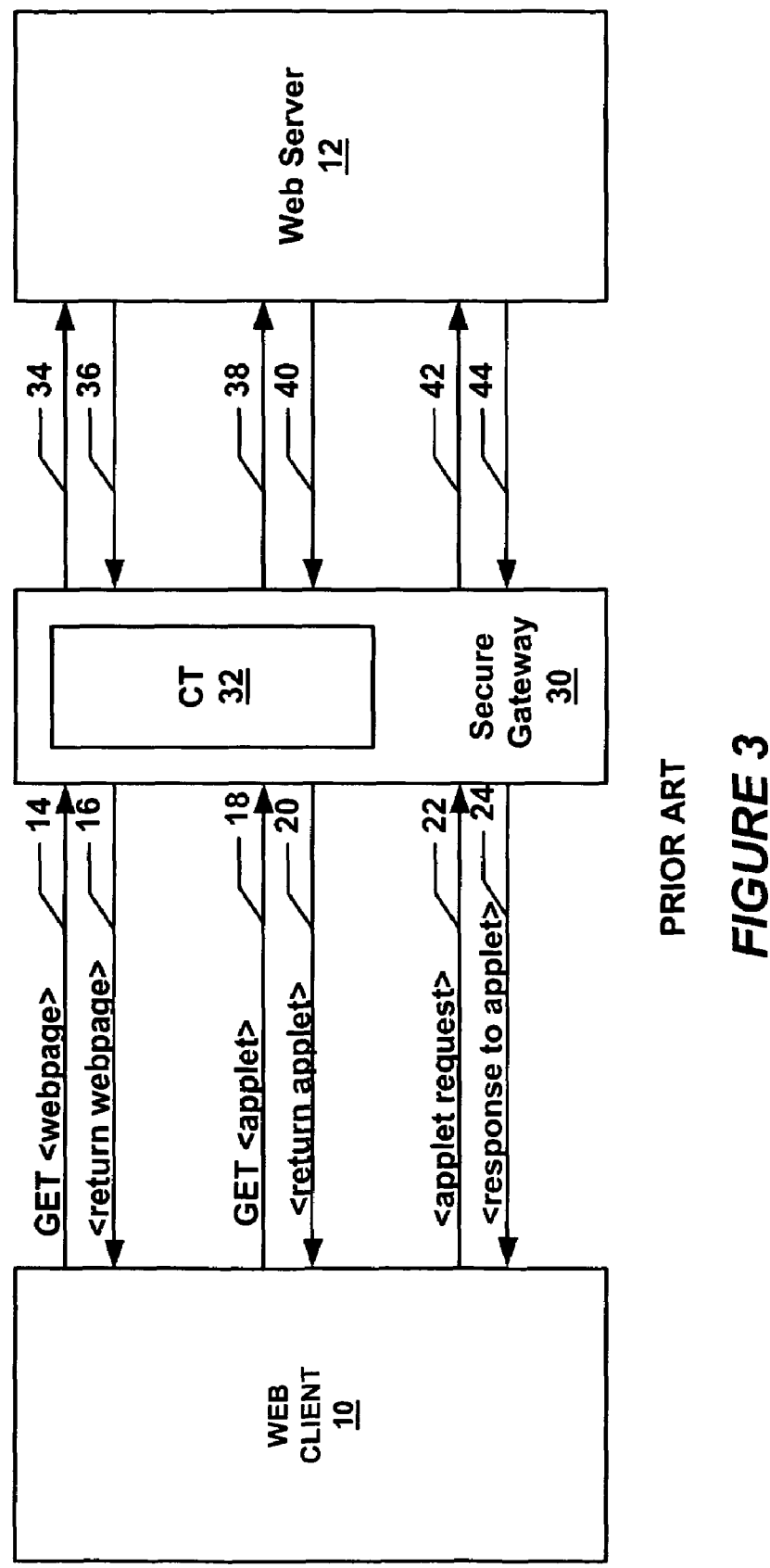
FIG. 3 illustrates an example system that performs conventional secure gateway content transformation.

Referring now to FIG. 3 a similar scenario as depicted in FIG. 2 is shown however; in this scenario the content transformation application 32 also handles the returned applet such that the return applet has had its content transformed such that any URL's which are hard-coded in the applet have been converted to make their way through the Secure Gateway 30 to the Web Server 12. In this scenario, the Web client 10 requests a web page from a Web Server 12. This request is shown by the GET <web page> command 14 sent from the Web client 10 to the Secure Gateway 30. The Secure Gateway allows the command to be directed to the Web server 12 as shown by command 34. The Web Server 12, in response to receiving the GET <web page> command 34 returns the requested web page 36 to the Secure Gateway 30. The Secure Gateway passes on the web page to the Web Client 10 as shown by the <return web page> response 16. For certain web pages, the web page may contain a reference to an applet. In such a case the Web client 10 requests the applet from the Web Server 12 as shown by the GET <applet> command 18 sent to the Secure Gateway 30. The Secure Gateway 30 forwards the command 38 to the Web Server 12. The Web Server 12 responds by returning the applet 40 to the Secure Gateway 30. The applet may in turn include a hard-coded URL. In such a case the Web client 10 request the URL via the <applet request> 22 from the Web Server 12. The content transformation application 32 handles the returned applet such that the return applet has had its content transformed such that any URL's that are hard coded in the applet have been converted to make their way through the Secure Gateway 30 to the Web Server 12. The Secure Gateway in turn forwards the applet to the Web client 10, as shown by the <return applet> response 20.

In such an environment, in order to access the Web resources (Web Server), the Web Client 10 initiates a secure session with the Secure Gateway 30, which in turn establishes a connection with the Internal Web Server 12 and fetches the requested page. The page, before being sent to the Web client 10, needs necessary massaging of URL links embedded in them. In other words, the URL links in the page serviced by the Internal Web Server will have all the links understood only within the Internal network. This is modified in such a way that, when the page is displayed at the Client Web Browser, all these URL links will reference the Secure Gateway address. This way, anytime the user "clicks" on any of the links within the page, the request is ensured to be directed towards the Secure Gateway 30. The Content transformation application 32 does the URL substitution, so that the requests are directed towards the Secure Gateway 30. This procedure puts a heavy load on the Secure Gateway 30 and scalability is affected as well.

Figure 4:
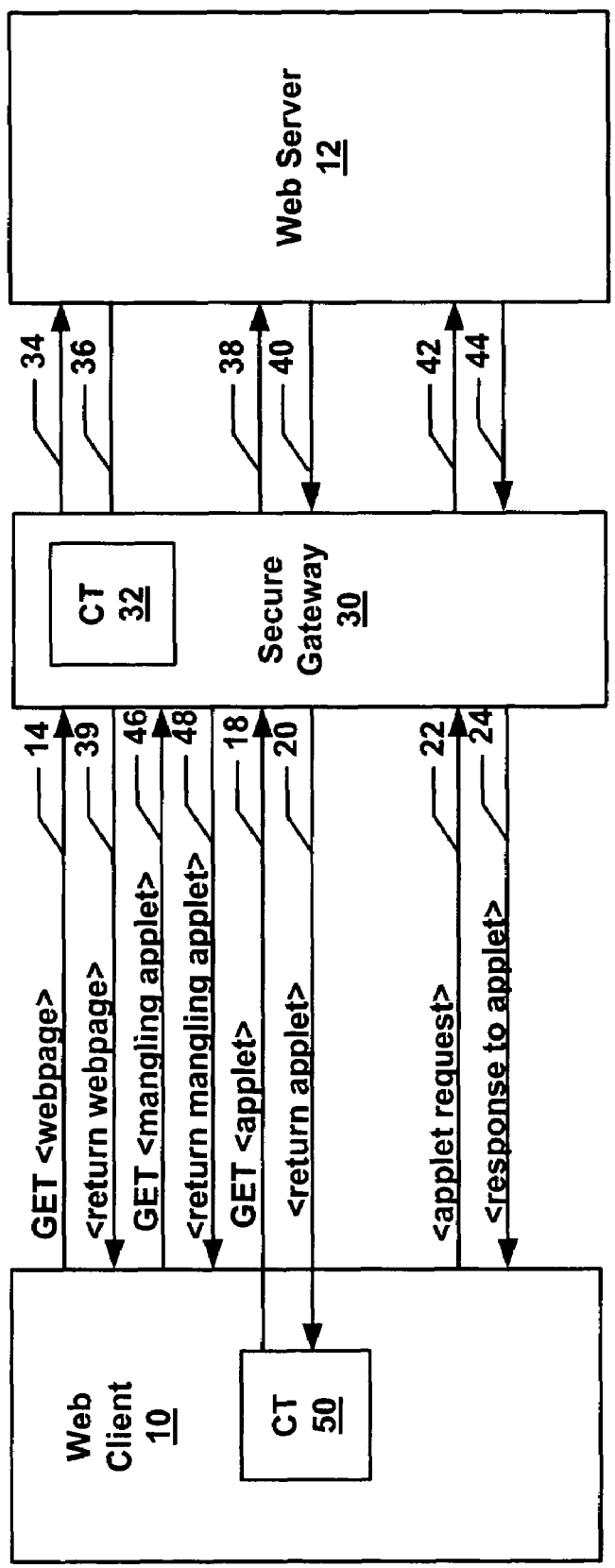
FIG. 4 illustrates an example system that performs client-side Java content transformation in accordance with embodiments of the present invention.

Referring now FIG. 4, a particular embodiment of a system for performing client-side Java content transformation is shown. This environment is similar to the environment of FIG. 3, with the addition that the Web client 10 has also been provided with a content transformation application 50.

In this scenario, the Web client 10 requests a web page from a Web Server 12. This request is shown by the GET <web page> command 14 sent from the Web client 10 to the Secure Gateway 30. The Secure Gateway allows the command to be directed to the Web server 12 as shown by command 34. The Web Server 12, in response to receiving the GET <web page> command 34 returns the requested web page 36 to the Secure Gateway 30. The Secure Gateway, instead of passing on the web page to the Web Client instead returns a web page 39 that has been modified to request a content transformation application. It also HTML content transfers other HTML URLs on that page. This will be true for all SSL Secure Gateways. The Web client 10 request the content transformation application from the Web Server 12 as shown by the GET <mangling applet> command 46 sent to the Secure Gateway 30. The Secure Gateway 30 forwards the content transformation application to the Web client 10, as shown by the <return mangling applet> response 48. The Web client 10 then requests the applet from the Web Server 12 as shown by the GET <applet> command 18 sent to the Secure Gateway 30. The Secure Gateway 30 forwards the command 38 to the Web Server 12. The Web Server 12 responds by returning the applet 40 to the Secure Gateway 30. The Secure Gateway in turn forwards the applet to the Web client 10, as shown by the <return applet> response 20. The applet may in turn include a hard-coded URL. The content transformation application 50 handles the returned applet such that the return applet has had its content transformed such that any URLs that were hard-coded in the applet have been converted to make their way through the Secure Gateway 30 to the Web Server 12 In such a case the Web client 10 request the URL via the <applet request> 22 from the Web Server 12.

This approach shown in FIG. 4 resolves problems involving pages and applets having hard coded URLs having to be processed at the Secure Gateway. Also, this procedure removes what may have otherwise been a heavy load on the Secure Gateway 30. Additionally, the present invention alleviates the need for a Java Virtual Machine on the Gateway. Unlike with the conventional implementation where a gray rectangle would appear on the page while the Secure Gateway is mangling the Java Applet, with this invention the user could see an animation as soon as the "Mangling Applet" starts running at the client. This could greatly improve the user-perceived system responsiveness.

Figure 5A:
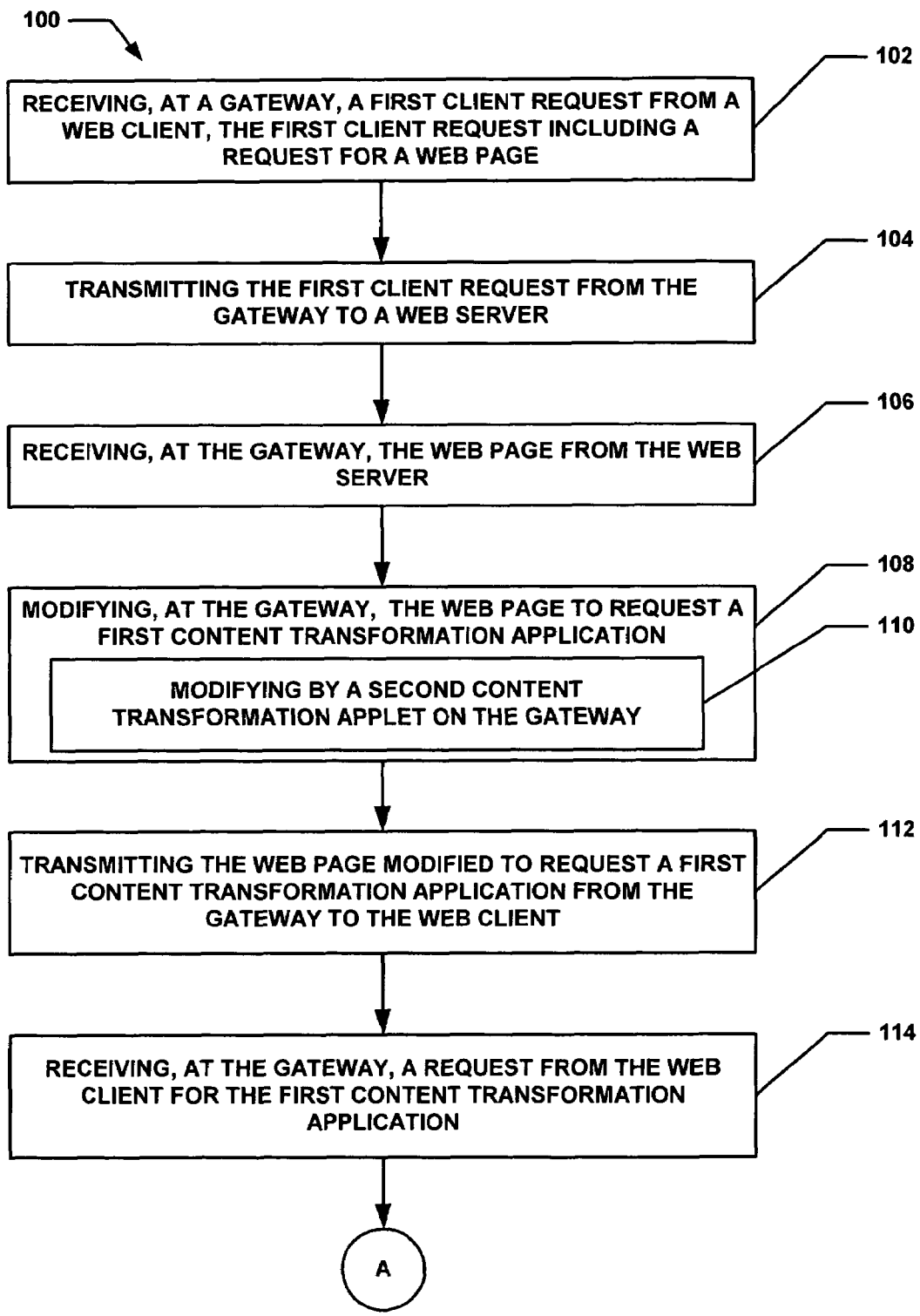
FIGS. 5A and 5B comprise flow diagrams of an embodiment of a process for performing client-side Java content transformation in accordance with embodiments of the present invention.
Figure 5B:
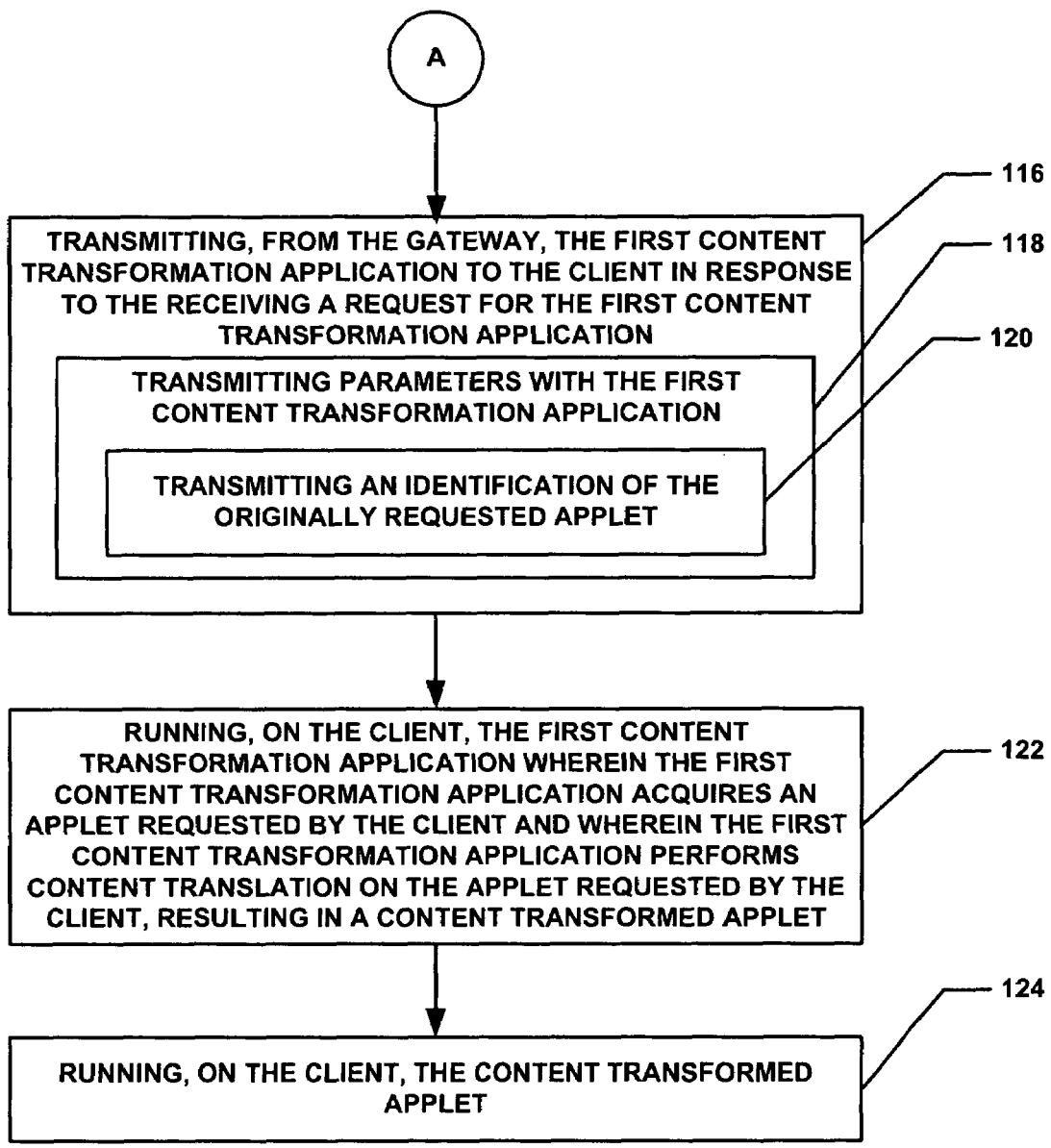
Figure 6:
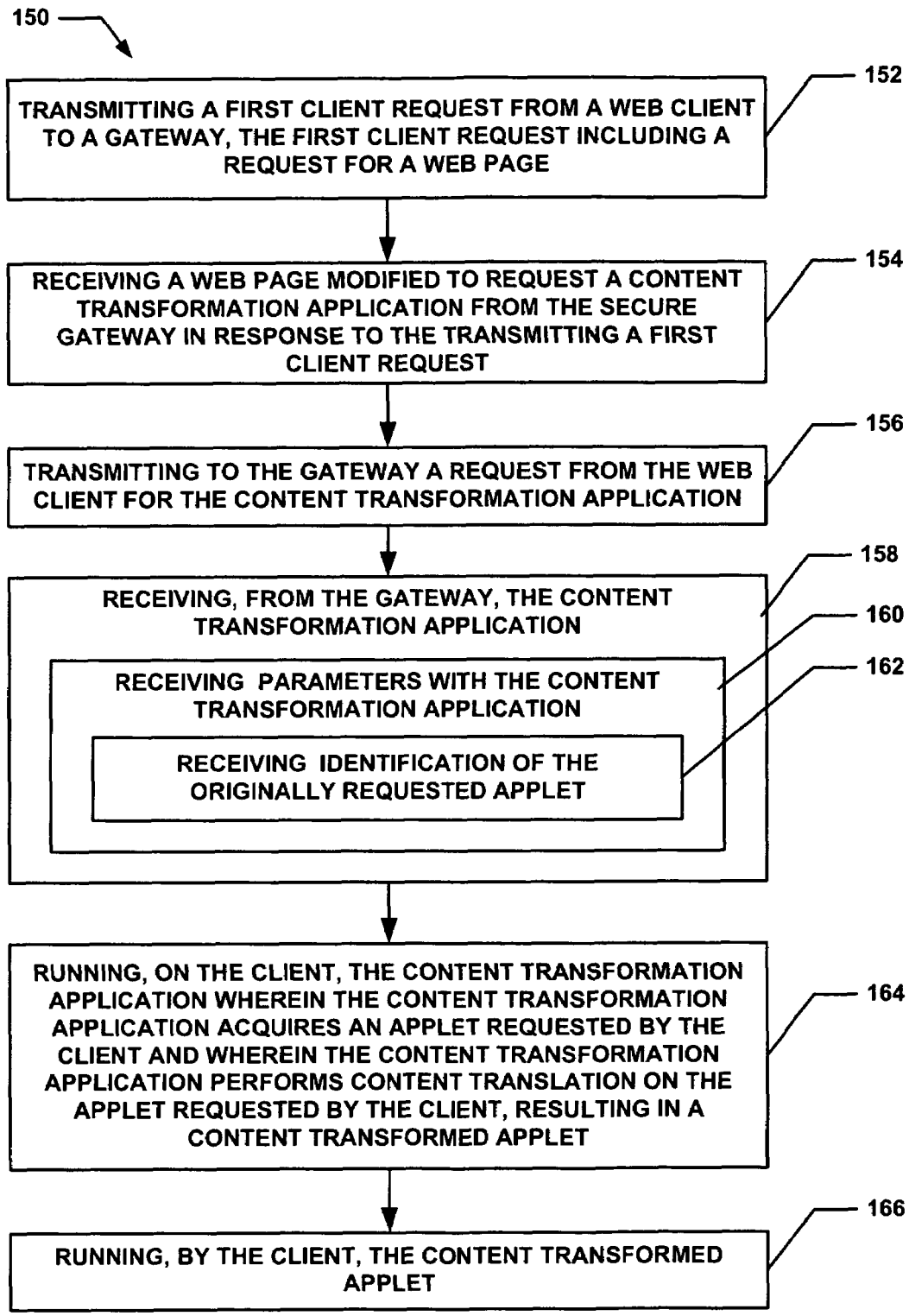
FIG. 6 comprises a flow diagram of another embodiment of a process for performing client-side Java content transformation in accordance with embodiments of the present invention.

A flow chart of particular embodiments of presently disclosed methods are depicted in FIGS. 5A, 5B and 6. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 5A and 5B, a particular embodiment of a method 100 for performing client-side Java content transformation is shown. The method 100 begins with processing block 102 wherein a first client request is received at a gateway from a web client, the first client request including a request for a web page.

In processing block 104 the first client request is transmitted from the gateway to a web server. In processing block 106 the web page is received at the gateway from the web server.

In processing block 108 the web page is modified at the gateway. The modification involves requesting a content transformation application. The modifying is performed by a second content transformation application located on the gateway, as described in processing block 110.

In processing block 112 the web page, modified to request a content application applet from the gateway, is transmitted the web client. In processing block 114 a request from the web client for the content transformation application is received at the gateway.

In processing block 116 the content transformation application is transmitted from the gateway to the client in response to the receipt of a request for the content transformation application. As shown in processing block 118 transmitting the content transformation application may further comprise transmitting parameters with the content transformation application. In processing block 120, transmitting parameters comprises transmitting an identification of the originally requested applet.

In processing block 122 the content transformation application is run on the client, wherein the content transformation application acquires the applet requested by the client and wherein the content transformation application performs content translation on the applet requested by the client, resulting in a content transformed applet. In processing block 124, the content transformed applet is run on the client.

Referring now to FIG. 6 another particular embodiment 150 for performing client-side Java content transformation is shown. The method 150 begins with processing block 152 wherein a first client request is transmitted from a web client to a gateway. The first client request includes a request for a web page.

In processing block 154, in response to the sending the first client request, a web page, modified to request a content transformation application from the secure gateway, is received. In processing block 156 a request from the web client for the content transformation application is transmitted to the gateway.

In processing block 158 the content transformation application is received from the gateway. As shown in processing block 160, in some embodiment, receiving the content transformation application further comprises receiving parameters with the content transformation application. As recited by processing block 162 receiving parameters comprises receiving identification of the originally requested applet.

In processing block 164 the content transformation application is run on the client, wherein the content transformation application acquires an applet requested by the client and wherein the content transformation application performs content translation on the applet requested by the client, resulting in a content transformed applet. In processing block 166 the content transformed applet is run by the client.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of performing client-side Java content transformation comprising:
   receiving, at a gateway, a first client request from a web client, the first client request including a request for a web page;
   transmitting said first client request from said gateway to a web server;
   receiving, at said gateway, said web page from said web server;
   modifying, at said gateway, said web page to request a content transformation application;
   transmitting said web page modified to request a content transformation application from said gateway to said web client;
   receiving, at said gateway, a request from said web client for said content transformation application;
   transmitting, from said gateway, said content transformation application to said client in response to said receiving a request for said content transformation application; and
   running, on said client, said content transformation application wherein said content transformation application acquires an applet requested by said client and wherein said content transformation application performs content translation on said applet requested by said client, resulting in a content transformed applet;
   wherein:
      the content transformation application is pre-loaded on the gateway; and
      performing content translation on said applet requested by said client includes converting all URLs that were hard-coded in said applet such that the converted URLs are configured to make their way through the gateway.

2. The method of claim 1 further comprising running, on said client, said content transformed applet.

3. The method of claim 1 wherein said modifying said web page comprises modifying by a second content transformation application on said gateway.

4. The method of claim 1 wherein said transmitting said content transformation application comprises transmitting parameters with said content transformation application.

5. The method of claim 4 wherein said transmitting parameters comprises transmitting an identification of the originally requested applet.

6. A method as in claim 1 wherein performing content translation on said applet further includes disassembling byte code of said applet on said client.

7. A method as in claim 1 wherein:
   acquiring the applet requested by said client includes:
      transmitting, from said client to said gateway, an HTTP GET request for the applet; and
      receiving, at said client from said gateway, the applet; and
   converting all URLs that were hard-coded in said applet includes substituting, for each URL contained within the applet that points to the web server, a URL that instead points to the gateway.

8. A method as in claim 1 wherein modifying, at said gateway, said web page to request a content transformation application includes inserting, into said web page received from said web server, an instruction to request a content transformation application, such an instruction having been absent from said web page upon receipt from said web server.

9. A method of performing client-side Java content transformation comprising:
- transmitting a first client request from a web client to a gateway, the first client request including a request for a web page;
- receiving a web a e modified to request a content transformation application from said gateway in response to said transmitting a first client request;
- transmitting to said gateway a request from said web client for said content transformation application;
- receiving, from said gateway, said content transformation application;
- running, on said client, said content transformation application wherein said content transformation application acquires an applet requested by said client and wherein said content transformation application performs content translation on said applet requested by said client, resulting in a content transformed applet;
- wherein:
    - the content transformation application is pre-loaded on the gateway; and
    - performing content translation on said applet requested by said client includes converting all URLs that were hard-coded in said applet such that the converted URLs are configured to make their way through the gateway.

10. The method of claim 9 further comprising running, by said client, said content transformed applet.

11. The method of claim 9 wherein said receiving said content transformation application further comprises receiving parameters with said content transformation application.

12. The method of claim 11 wherein said receiving parameters comprises receiving identification of the originally requested applet.

13. A method as in claim 9 wherein the method further comprises:
- while the content transformation application performs content translation on said applet, displaying an animation at said client indicating that the content transformation application is running.

14. A method as in claim 9 wherein performing content translation on said applet further includes disassembling byte code of said applet on said client.

15. A method as in claim 9 wherein:
- acquiring the applet requested by said client includes:
    - transmitting, from said client to said gateway, an HTTP GET request for the applet; and
    - receiving, at said client from said gateway, the applet; and
- converting all URLs that were hard-coded in said applet includes substituting, for each URL contained within the applet that points to the web server, a URL that instead points to the gateway.

16. A computer system comprising:
- a secure gateway, running on a first computer, including a first content transformation application;
- a web client, running on a second computer, the second computer being distinct from the first computer, said web client being in communication with said secure gateway, said web client including a second content transformation application; and
- a web server, running on a third computer, the third computer being distinct from the first computer and the second computer, said web server being in communication with said secure gateway;
- wherein said first content transformation application modifies said web page to request a second content transformation application;
- wherein said second content transformation application acquires an applet originally requested by said client and wherein said second content transformation application performs content translation on said applet originally requested by said client, resulting in a content transformed applet; and
- wherein:
    - the second content transformation application is pre-loaded on the secure gateway; and
    - performing content translation on said applet requested by said client includes converting all URLs that were hard-coded in said applet such that the converted URLs are configured to make their way through the secure gateway.

17. The computer system of claim 16 wherein said second content transformation application further transmits parameters with said first content transformation application.

18. The computer system of claim 17 wherein said parameters include identification of the originally requested applet.

19. A computer system as in claim 16 wherein performing content translation on said applet further includes disassembling byte code of said applet on said client.

20. A computer system as in claim 16 wherein:
- acquiring the applet originally requested by said client includes:
    - transmitting, from said client to said secure gateway, an HTTP GET request for the applet; and
    - receiving, at said client from said secure gateway, the applet; and
- converting all URLs that were hard-coded in said applet includes substituting, for each URL contained within the applet that points to the web server, a URL that instead points to the secure gateway.

21. A system comprising:
- means for receiving, at a gateway running on a first computer, a first client request from a web client, the first client request including a request for a web page;
- means for transmitting said first client request from said gateway to a web server;
- means for receiving, at said gateway, said web page from said web server;
- means for modifying, at said gateway, said web page to request a content transformation application;
- means for transmitting said web page modified to request a content transformation application to said web client;
- means for receiving, at said gateway, a request from said web client for said content transformation application;
- means for transmitting, from said gateway, said content transformation application to said client in response to said receiving a request for the content transformation application;
- means for running, on said client running on a second computer distinct from the first computer, said content transformation application wherein said content transformation application acquires said applet requested by said client and wherein said content transformation application performs content translation on said applet requested by said client, resulting in a content transformed applet; and
- means for running, on said client, said content transformed applet;
- wherein performing content translation on said applet requested by said client includes converting all URLs that were hard-coded in said applet such that the converted URLs are configured to make their way through the gateway.

22. A computer system as in claim 21 wherein performing content translation on said applet further includes disassembling byte code of said applet on said client.

23. A system as in claim 21 wherein:
acquiring said applet requested by said client includes:
   transmitting, from said client to said gateway, an HTTP GET request for the applet; and
   receiving, at said client from said gateway, the applet; and
converting all URLs that were hard-coded in said applet includes substituting, for each URL contained within the applet that points to the web server, a URL that instead points to the gateway.

24. A system as in claim 21 wherein the means for modifying, at said gateway, said web page to request a content transformation application include means for inserting, into said web page received from said web server, an instruction to request a content transformation application, such an instruction having been absent from said web page upon receipt from said web server.

25. A system comprising:
means for transmitting a first client request from a web client to a gateway running on a first computer, the first client request including a request for a web page;
means for receiving a web page modified to request a content transformation application from said gateway in response to said transmitting a first client request;
means for transmitting to said gateway a request from said web client for said content transformation application;
means for receiving, from said gateway, said content transformation application;
means for running, on said client running on a second computer distinct from the first computer, said content transformation application wherein said content transformation application acquires said applet requested by said client and wherein said content transformation application performs content translation on said applet requested by said client, resulting in a content transformed applet; and
means for running, on said client, said content transformed applet;
wherein performing content translation on said applet requested by said client includes converting all URLs that were hard-coded in said applet such that the converted URLs are configured to make their way through the gateway.

26. A computer system as in claim 25 wherein performing content translation on said applet further includes disassembling byte code of said applet on said client.

27. A system as in claim 25 wherein:
acquiring said applet requested by said client includes:
   transmitting, from said client to said gateway, an HTTP GET request for the applet; and
   receiving, at said client from said gateway, the applet; and
converting all URLs that were hard-coded in said applet includes substituting, for each URL contained within the applet that points to the web server, a URL that instead points to the gateway.

* * * * *

UNITED STATES PATENT AND TRADEMARK OFFICE
CERTIFICATE OF CORRECTION

| | |
|---|---|
| PATENT NO. | : 7,707,223 B2 |
| APPLICATION NO. | : 11/117222 |
| DATED | : April 27, 2010 |
| INVENTOR(S) | : Igor V. Zubenko and Todd Short |

It is certified that error appears in the above-identified patent and that said Letters Patent is hereby corrected as shown below:

Claim 9, Column 9, Lines 6-8, "receiving a web a e modified to request a content transformation application from said gateway in response to said transmitting a first client request;" should read --receiving a web page modified to request a content transformation application from said gateway in response to said transmitting a first client request;--

Signed and Sealed this

Eighth Day of June, 2010

David J. Kappos
*Director of the United States Patent and Trademark Office*